US011683667B2

(12) United States Patent
Chandramouli et al.

(10) Patent No.: US 11,683,667 B2
(45) Date of Patent: Jun. 20, 2023

(54) SHORT MESSAGE SERVICE OVER NON-ACCESS STRATUM WITH HOME-ROUTED MODEL

(71) Applicant: NOKIA TECHNOLOGIES OY, Espoo (FI)

(72) Inventors: Devaki Chandramouli, Plano, TX (US); Curt Wong, Bellevue, WA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/476,769

(22) PCT Filed: Jan. 10, 2018

(86) PCT No.: PCT/US2018/013147
§ 371 (c)(1),
(2) Date: Jul. 9, 2019

(87) PCT Pub. No.: WO2018/132462
PCT Pub. Date: Jul. 19, 2018

(65) Prior Publication Data
US 2019/0357020 A1  Nov. 21, 2019

Related U.S. Application Data

(60) Provisional application No. 62/444,632, filed on Jan. 10, 2017.

(51) Int. Cl.
*H04W 76/25* (2018.01)
*H04W 4/14* (2009.01)
(Continued)

(52) U.S. Cl.
CPC ............... *H04W 4/14* (2013.01); *H04W 8/08* (2013.01); *H04W 12/08* (2013.01); *H04W 60/00* (2013.01); *H04W 76/25* (2018.02)

(58) Field of Classification Search
CPC ....... H04W 8/08; H04W 12/08; H04W 76/25; H04W 60/00; H04W 4/14
See application file for complete search history.

(56) References Cited

U.S. PATENT DOCUMENTS 6,101,393 A  8/2000 Alperovich et al.
8,923,812 B1  12/2014 Koum et al.
(Continued)

FOREIGN PATENT DOCUMENTS

EP   2 568 728 A2   3/2013

OTHER PUBLICATIONS

International Search Report and Written Opinion dated Mar. 8, 2018 corresponding to International Patent Application No. PCT/US2018/013147.

(Continued)

*Primary Examiner* — Syed Ali
(74) *Attorney, Agent, or Firm* — Squire Patton Boggs (US) LLP

(57) ABSTRACT

Various communication systems may benefit from appropriate handling of messages. For example, certain fifth generation communication systems may benefit from short message service over non-access stratum with a home-routed model. A method can include receiving a request, at a short message service function, to associate an access management function to the short message service function. The method can also include accepting the request.

4 Claims, 12 Drawing Sheets

(51) Int. Cl.
*H04W 8/08* (2009.01)
*H04W 60/00* (2009.01)
*H04W 12/08* (2021.01)

(56) References Cited

U.S. PATENT DOCUMENTS

| | | | |
|---|---|---|---|
| 2008/0207181 A1 | 8/2008 | Jiang | |
| 2009/0207757 A1* | 8/2009 | Andreasen | H04L 12/1403 370/254 |
| 2013/0268604 A1* | 10/2013 | Gupta | H04W 48/18 709/206 |
| 2015/0030019 A1* | 1/2015 | Chandramouli | H04L 51/38 370/356 |
| 2016/0268604 A1 | 9/2016 | Saruwatari et al. | |
| 2017/0303259 A1* | 10/2017 | Lee | H04W 72/51 |
| 2017/0311304 A1* | 10/2017 | Lu | H04W 72/20 |
| 2018/0007557 A1* | 1/2018 | Lee | H04W 12/069 |
| 2018/0242147 A1* | 8/2018 | Fransen | H04W 76/10 |
| 2019/0021064 A1* | 1/2019 | Ryu | H04W 76/27 |
| 2019/0166647 A1* | 5/2019 | Velev | H04W 80/10 |
| 2019/0174392 A1* | 6/2019 | Chun | H04W 48/08 |
| 2019/0246436 A1* | 8/2019 | Kim | H04L 65/1016 |
| 2019/0313473 A1* | 10/2019 | Kim | H04W 48/02 |
| 2019/0335316 A1* | 10/2019 | Kim | H04W 80/10 |
| 2019/0364541 A1* | 11/2019 | Ryu | H04W 80/10 |
| 2019/0380086 A1* | 12/2019 | Lee | H04W 48/16 |
| 2020/0178048 A1* | 6/2020 | Kim | H04W 12/062 |

OTHER PUBLICATIONS

Extended European Search Report dated Jun. 8, 2020 corresponding to European patent application No. 18738806.1.
Alcatel-Lucent: "Native SMS over NAS for PS only devices," 3GPP Draft; S2-115402_23888 SMS for PS Only V3, SA WG2 Meeting #88, Nov. 14-18, 2011, San Francisco, USA, Nov. 18, 2011, XP050575772.
Nokia: "SMS over NAS for 5G," 3GPP Draft; S2-170284 SMS over NAS.V4, SA WG2 Meeting #118BIS, Jan. 16-20, 2017, Spokane, Washington, Jan. 10, 2017, XP051205722.
Canadian Office Action issued in corresponding Canadian Patent Application No. 3,049,650 dated Nov. 27, 2020.
Indian Office Action issued in corresponding Indian Patent Application No. 201917027475 dated Jan. 14, 2021.

* cited by examiner

SHORT MESSAGE SERVICE OVER NON-ACCESS STRATUM WITH HOME-ROUTED MODEL

CROSS-REFERENCE TO RELATED APPLICATION

This application is related to and claims the benefit and priority of U.S. Provisional Patent Application No. 62/444,632, filed Jan. 10, 2017, the entirety of which is hereby incorporated herein by reference.

BACKGROUND

Field

Various communication systems may benefit from appropriate handling of messages. For example, certain fifth generation communication systems may benefit from short message service over non-access stratum with a home-routed model.

Description of the Related Art

Fifth generation (5G) is a new generation of radio systems and network architecture delivering extreme broadband, as well as ultra-robust, low latency connectivity and massive machine-to-machine connectivity for the Internet of Things (IoT) to enable the programmable world.

5G may, for example, aim to provide massive broadband that delivers gigabytes of bandwidth in uplink and downlink per second on demand. 5G may also provide critical machine-type communication that allows for the immediate, or with extreme low end to end (e2e) latency, synchronous eye-hand feedback that permits remote control of robots and cars. Furthermore, 5G may also provide massive machine-type communication that connects billions of sensors and machines.

The biggest difference between 4G and 5G design requirements may be the diversity of use-cases that 5G networks may need to support as compared to 4G networks. 4G networks were primarily designed for the single use-case of delivering high speed mobile broadband.

5G may not only be a new radio access technology (RAT) family. The 5G architecture may expand to multiple dimensions by providing a common core for multiple radio technologies (for example, cellular, Wi-Fi, and fixed), multiple service (for example, IoT, mobile broadband, low latency-high reliability) and multiple network and service operators.

FIG. 1 illustrates an example of a short message service (SMS) function in a fifth generation core network. The 5G core network may provide SMS over non-access stratum (NAS) to a user equipment (UE). In FIG. 1, the "SMS Function", regardless of it being implemented by the mobility management entity (MME) or mobile switching center (MSC) server may need to provide relay protocol (RP) layer and control protocol (CP) layer protocol and also other adjunct functionality like charging data record (CDR) and lawful intercept (LI), among others. For 5G, AMF may need to interact with some kind of "SMS Function" in order to provide SMS service to UE.

SUMMARY

According to a first embodiment, a method can include receiving a request, at a short message service function, to associate an access management function to the short message service function. The method can also include accepting the request.

In a variant, the method can include retrieving SMS subscription data and providing a location update to user data management upon receiving the request and prior to accepting the request.

In a variant, the request can be based on an attach message that includes an indication that short message service is required.

According to a second embodiment, a method can include requesting a short message service function to associate an access management function to the short message service function. The method can also include receiving an acceptance of the request.

In a variant, the method can include receiving an attach message that includes an indication that short message service is required. The request for the association can be based on receiving the indication.

In a variant, the method can further include sending an accept response to the attach message after receiving acceptance of the request.

In a variant, the method can also include obtaining an address of the short message service function from a user data management where the short message service function is located in the HPLMN. The request can be sent using the obtained address.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Figure 2:
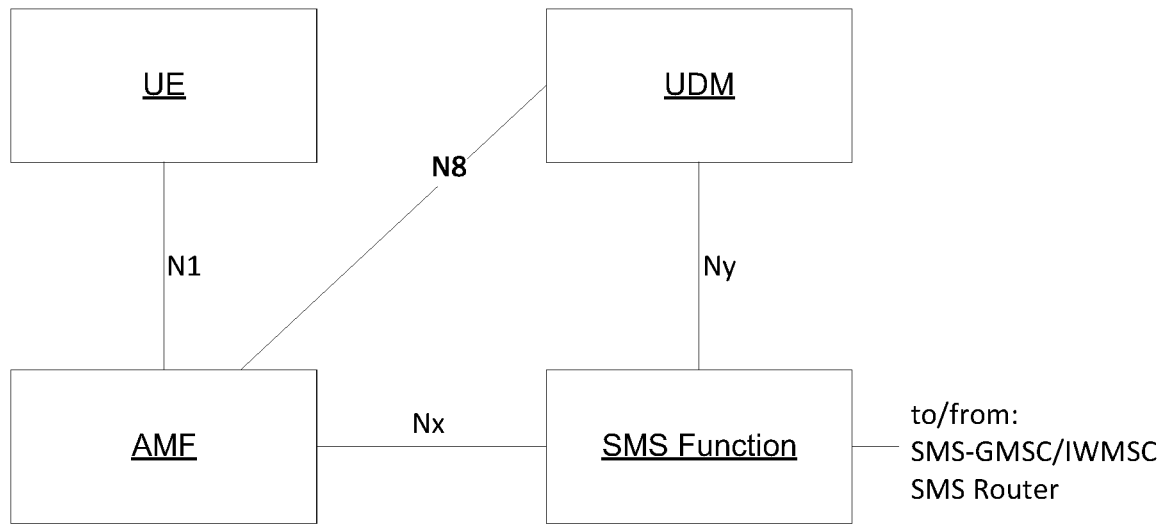
FIG. 2 illustrates a general representation of short message service architecture in fifth generation core network without reliance on circuit switched identities.

FIG. 2 illustrates a short message service architecture in fifth generation core network without reliance on circuit switched identities. Thus, FIG. 2 provides an architecture for SMS without any dependency on circuit switched (CS) identities such as temporary mobile subscriber identity (TMSI) or local area identity (LAI). Rather the illustrated approach can use a temporary identifier (ID) allocated by an access management function (AMF) to contain a pointer to the SMS function in order to enable selection of SMS function.

During initial registration, UE can include a request for SMS service. Based on the UE's request, the AMF can assign an SMS function and can ensure that the UE has a subscription to obtain an SMS service. Subscription check for SMS for the given UE can be performed either by the AMF or by a service management function (SMF). As part of response to initial registration, the AMF can assign a temporary ID-1 for the UE for subscriber confidentiality and this includes also AMF identifier (if it wishes to remain its serving function until it receives the next request for a given UE). Along with the temporary ID-1, AMF either encodes the pointer to SMS function with temporary ID-1 or creates another temporary ID-2 to point to the SMS function.

When the UE sends a subsequent non-access stratum (NAS) message to the AMF, the UE can include the allocated temporary identifiers. Based on the AMF identifier within the temporary ID-1, the radio access network (RAN) can route the message to the appropriate AMF. Similarly, either based on SMS function within temporary ID-1 or temporary ID-2, the AMF can determine the SMS function for the given UE.

When the UE needs to send an SMS to the network, the UE can encapsulate the SMS within the NAS transport message. This NAS transport message can be routed to the SMS function which can eventually route the SMS to the SMS center (SMSC).

When the SMS function needs to send an SMS to the UE, the SMSC can forwards the SMS via the SMS function/AMF, which can eventually encapsulate the SMS within the NAS transport message. The encapsulated SMS message can be routed to the UE.

Figure 3:
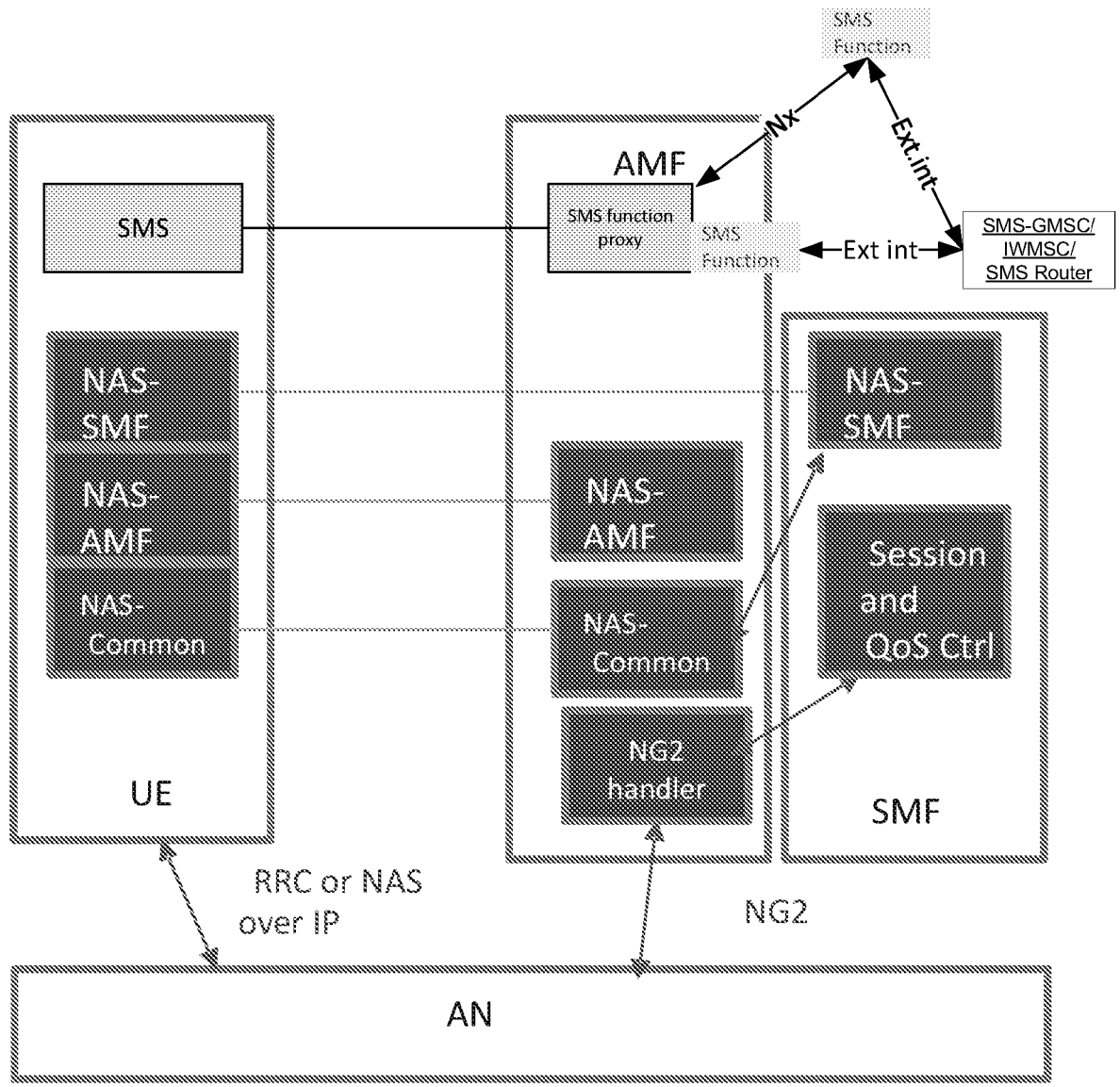
FIG. 3 illustrates an SMS function proxy for SMS function selection.

FIG. 3 illustrates an SMS function proxy for SMS function selection. One way to realize the above principle is that the AMF can contain an SMS function proxy as shown in FIG. 3. This SMS function proxy can be used to analyze the temporary ID-1 (or ID-2) to route to the proper SMS function. In the FIG. 3, a temporary ID (A) may point to an internal SMS function that has an external interface (e.g., SGd) toward IWMSC/SMS-GMSC/SMS Router, and another temporary ID (B) may point to an external SMS function via Nx.

SMS over NAS may be required for 5G. NAS can include a set of protocols used to convey non-radio signaling between the user equipment and the core network (CN). In LTE, SMS over NAS can be supported either by SGs interface with an MSC server, or with an "SMS in MME" option, as described at 3GPP TS 23.272. In the roaming scenario, a visited public land mobile network (VPLMN) may have to have an access to a local MSC server or implement the "SMS in MME option" in order to support SMS over NAS feature.

Figure 4:
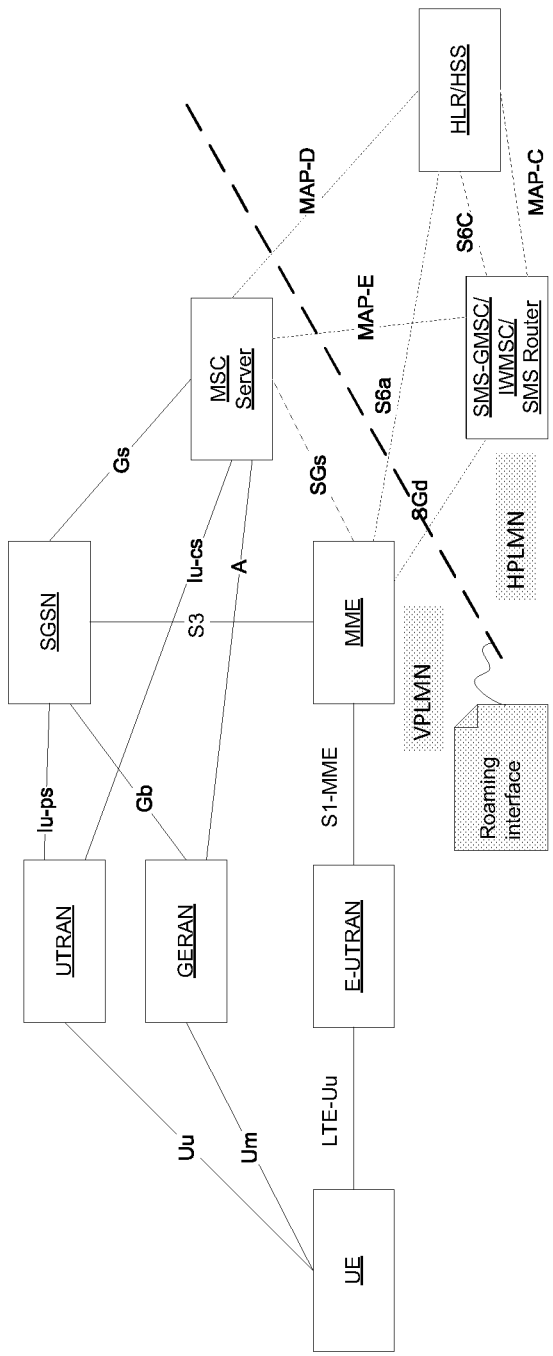
FIG. 4 illustrates SMS over NAS architecture used for 2/3G and LIE access.

FIG. 4 illustrates SMS over NAS architecture used for 2/3G and LTE access. In FIG. 4, the interfaces MAP-D, MAP-E, and SGs can represent the interfaces needed for "SMS over SGs", while the interfaces SGd, S6a and S6C can represent the interfaces needed for an "SMS in MME" option.

5G architecture may be built with a common core for multiple radio technologies, such as cellular, Wi-Fi, and fixed, and this common core may allow different type of green field operators to offer 5G services. In a roaming case, the HPLMN may not require that these green field operators can access a local MSC server for providing SMS for their roaming user. In other words, the HPLMN may not rely on VPLMN capabilities and service offering in order to offer SMS to their users.

Certain embodiments provide a home routed SMS architecture for 5G network in a roaming scenario. For example, certain embodiments provide an interface, called Nx for convenience and ease of reference without limitation, to allow an SMS function of, for example, an MSC server to interwork with an AMF in a 5G architecture.

Figure 1:
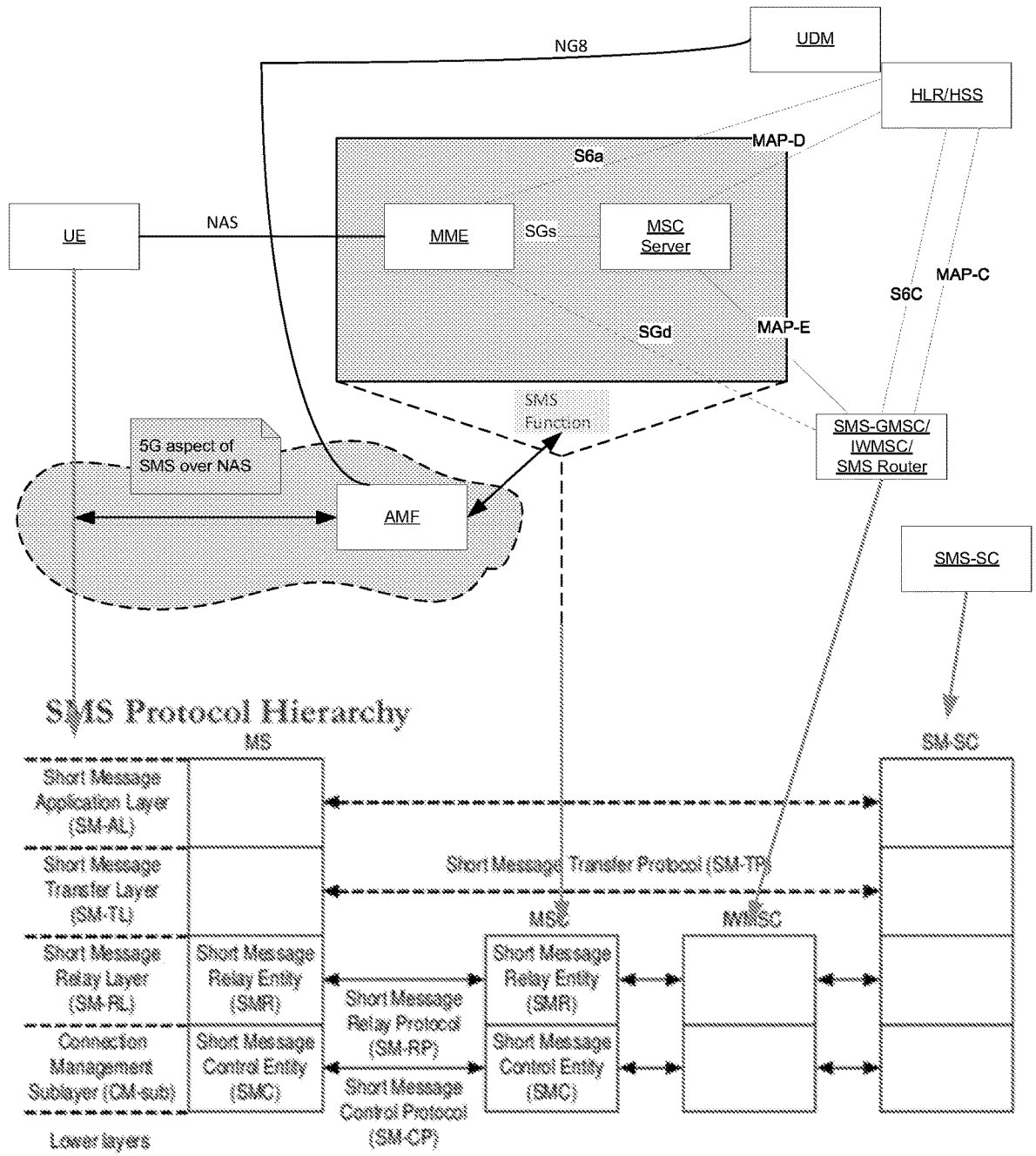
FIG. 1 illustrates an example of a short message service function in a fifth generation core network.

An SMS function can be mainly considered as handling the follow aspects. For example, an SMS function may handle control protocol (CP) and relay protocol (RP) layer functionality between a UE and the SMS function. FIG. 1 provides an illustration of protocol layer stacks among UE, MSC, and other SMS entities.

For another example, an SMS function can handle SMS delivery procedure toward UE, to/from IWMSC/SMS-GMSC, and interaction to HLR as required for SMS delivery defined in such 3GPP specifications as TS 23.040 and TS 23.272.

Further examples of SMS function responsibilities can include handling regulatory (for example lawful intercept) and charging (for example, CDR) requirements for SMS to the extent required.

Figure 5:
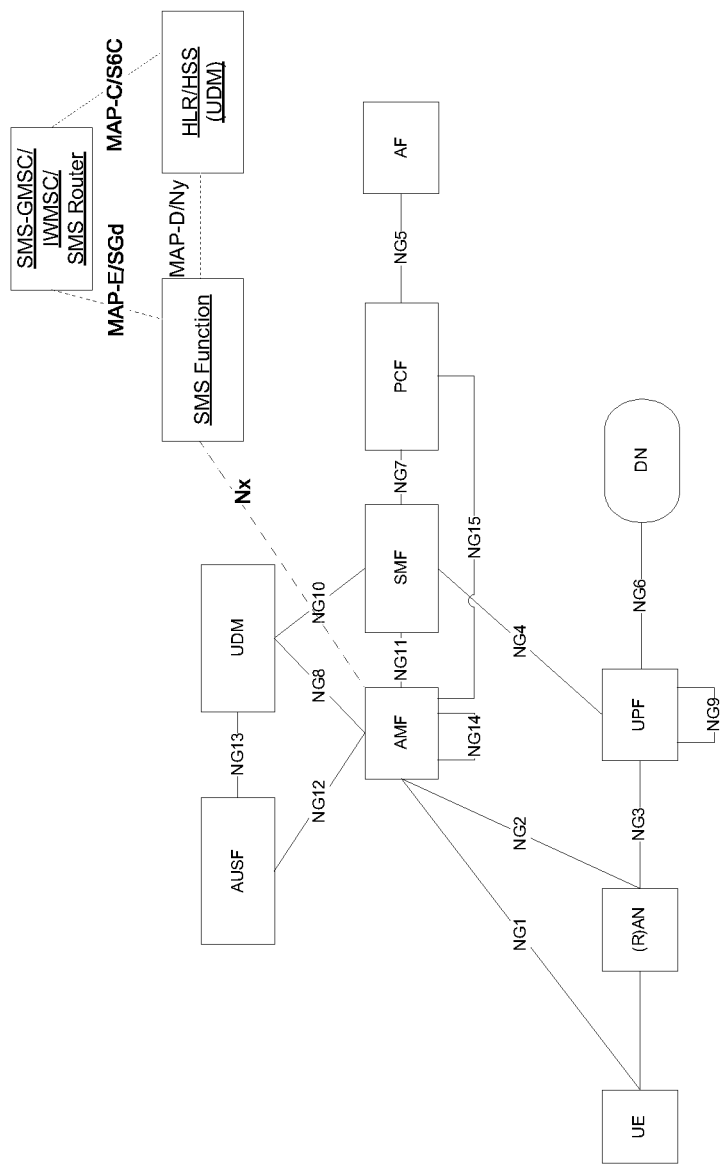
FIG. 5 illustrates a 5G non-roaming architecture, according to certain embodiments.

FIGS. 5 (non-roaming) and 6 (roaming) show how a Nx can connect to a 5G core network based on the currently agreed 5G architecture in TR 23.799 v 14.0.0. If SMS function is part of the MSC server, only the SMS related functionality of the MSC server may be used for Nx, because other CS services may not be supported. For example, there may be no CS fallback for 5G. Thus, the paging procedure over Nx may only be performed due to MT SMS.

FIG. 5 illustrates a 5G non-roaming architecture, according to certain embodiments. The architecture is shown relative to TR 23.799 (approved version V14.0.0), section 8.12, FIG. 8.12.2-2. However, FIG. 5 additionally shows four further interfaces, which may permit SMS over NAS architecture. For example, FIG. 5 illustrates interface Nx between the AMF and the SMS function. Moreover, interface MAP-D/Ny is shown between the SMS function and the home location register (HLR)/home subscriber server (HSS)/user data management (UDM). Interface MAP-C/S6C is shown between the HLR/HSS and the SMS-GMC/IWMSC/SMS router. Finally, interface MAP-E/SGd is shown between the SMS-GMC/IWMSC/SMS router and the SMS function.

Figure 6:
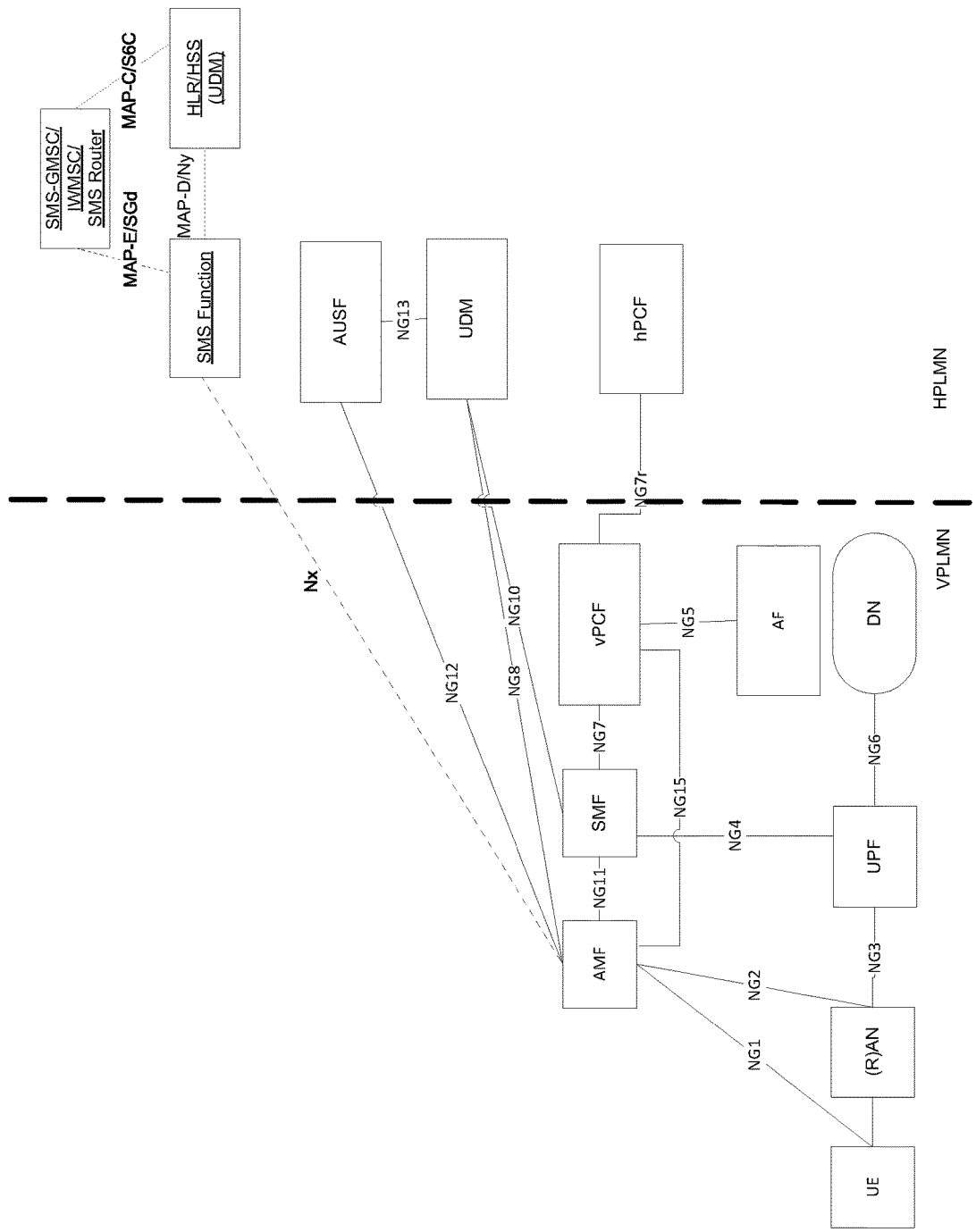
FIG. 6 illustrates a 5G roaming architecture, according to certain embodiments.

FIG. 6 illustrates a 5G roaming architecture, according to certain embodiments. The architecture is shown relative to TR 23.799 (approved version V14.0.0), section 8.12, FIG. 8.12.2-3. However, FIG. 6 additionally shows interface Nx between the AMF and the SMS function. Moreover, interface MAP-D/Ny is shown between the SMS function and the HLR/HSS. Interface MAP-C/S6C is shown between the HLR/HSS and the SMS-GMC/IWMSC/SMS router. Finally, interface MAP-E/SGd is shown between the SMS-GMC/IWMSC/SMS router and the SMS function.

Figure 7:
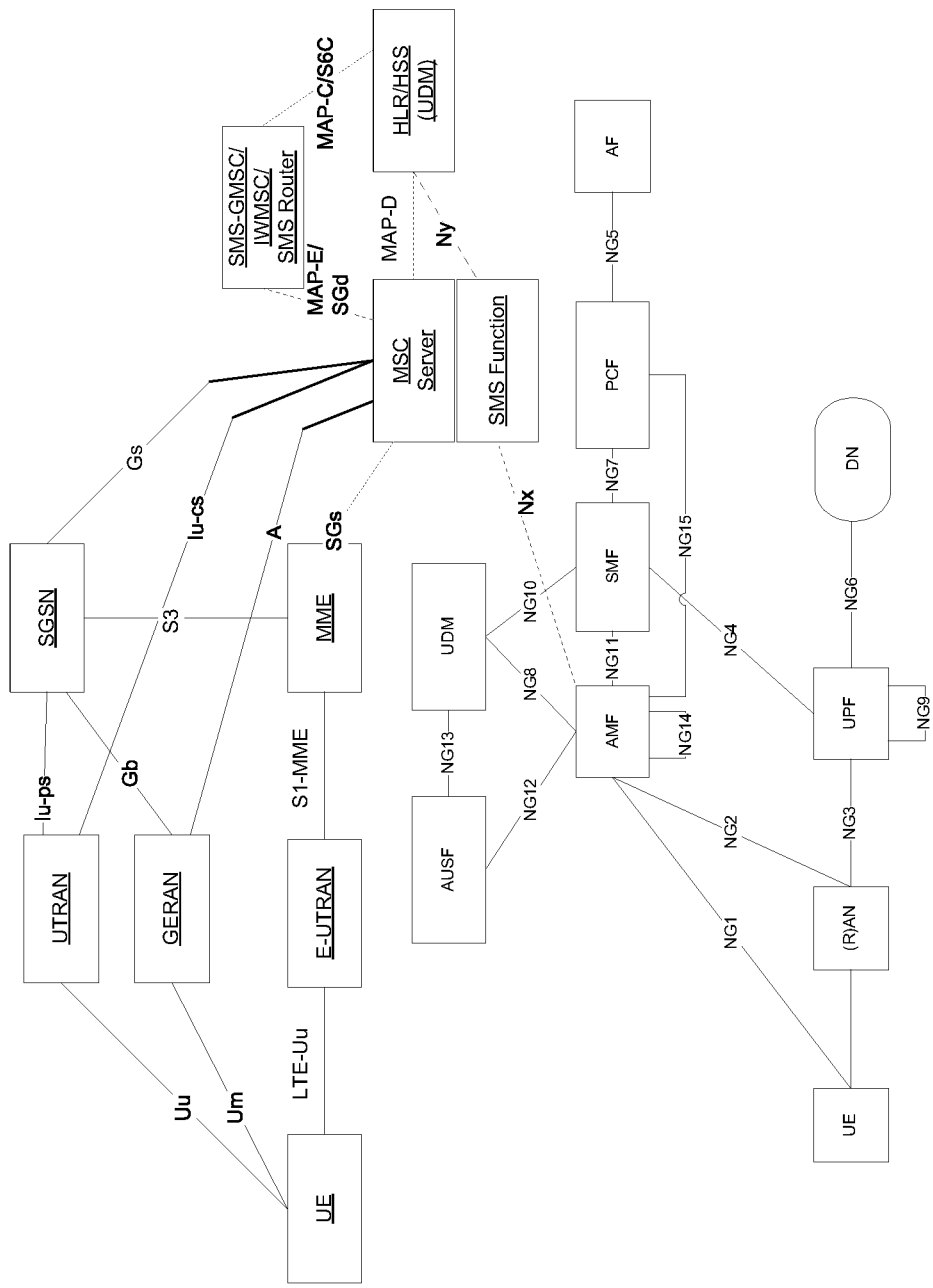
FIG. 7 illustrates an overall combined architecture when a network is already supporting SMS for 2/3/LTE with the addition of 5G, according to certain embodiments.

FIG. 7 illustrates an overall combined architecture when a network is already supporting SMS for 2/3/LTE with the addition of 5G, according to certain embodiments. As with FIGS. 5 and 6, the figure illustrates the four interfaces, Nx, MAP-E/SGd, MAP-C/S6C, and MAP-D/Ny.

The SMS function can either be a standalone function, collocated with an ANT, or collocated with an MSC server. The SMS function can also interface with an SMSC either with Map-E interface or SGd interface.

If the SMS function is collocated with the MSC, then it can use Nx and can be assumed to reuse SGs procedure to provide SMS over NAS support for 5G UE. Thus, current MSC server functionality supporting SMS over SGs can be reused without impact to MAP-C, MAP-E, SMS-SC/IWMSC/SMS-Router, and HLR/HSS.

When a UE is attached to 2/3/LTE, the existing SMS procedure (as supported in existing deployment—either using SMS over SGs or SMS natively) can be reused without impact to existing SMS over 2/3/LTE architecture. Accordingly, SMS can work as a user switches over to legacy RATs.

Certain embodiments may define Nx such that this interface can be a roaming interface. To enable this functionality, or for other reasons, during a 5G attach procedure, AMF in the VPLMN can receive the SMS function address from UDM for establishing the Nx association with the HPLMN SMS Function. This can apply to a roaming case.

For a non-roaming case, the selected SMS-Function may belong to the same MSC server used for 2/3/LTE access for the user who may be switching RAT due to mobility within an area. Hence, the SMS function selection procedure in the AMF (HPLMN) can be based on network planning data as well as the SMS-Function address received from UDM.

Figure 8:
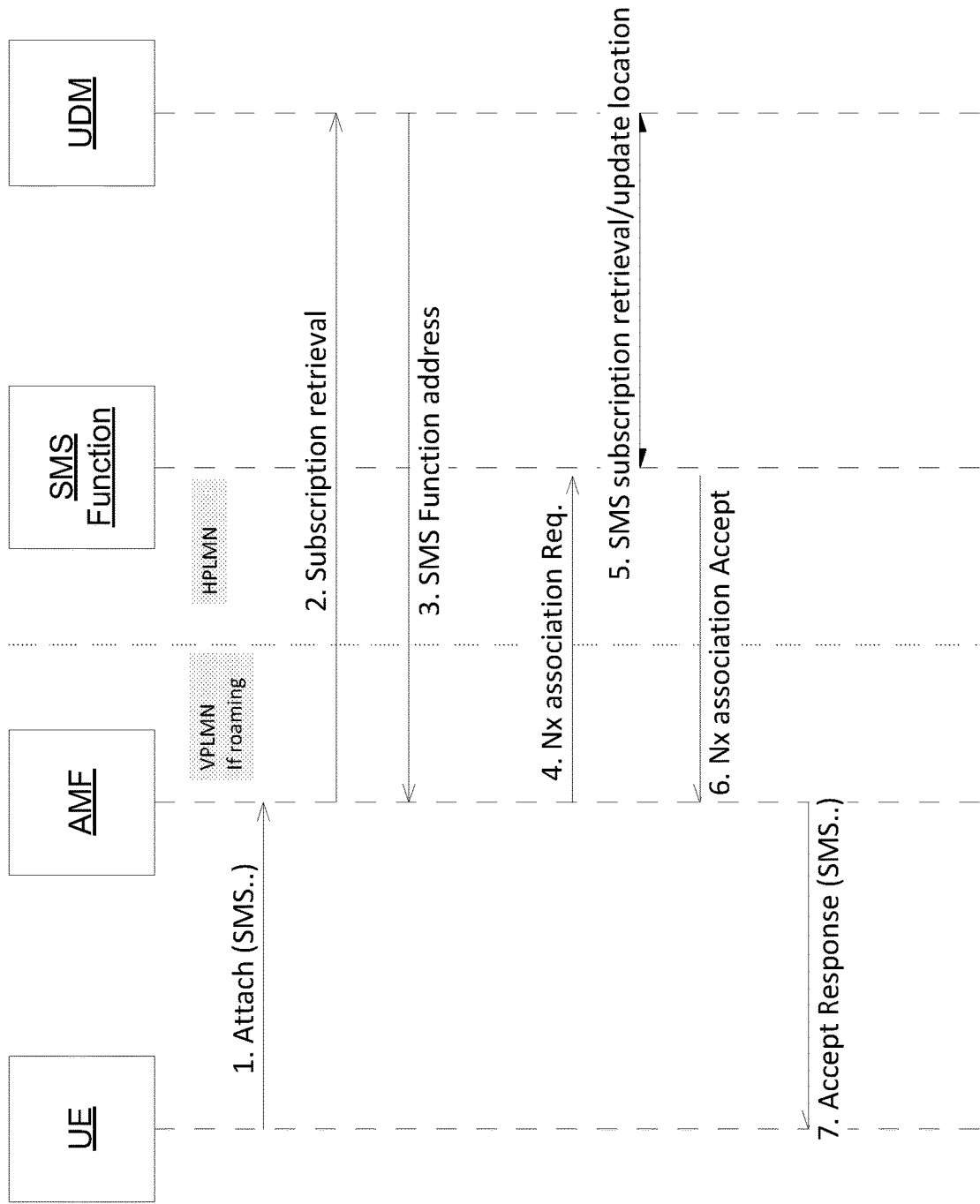
FIG. 8 illustrates an attach procedure according to certain embodiments.

FIG. 8 illustrates an attach procedure according to certain embodiments. The following attach procedure shows how Nx can be established during a 5G attach procedure, for example in a roaming case.

As shown in FIG. 8 at 1, at a 5G attach or registration procedure, a UE can indicates an SMS required indication. There is no need to use combined type of evolved packet system (EPS)/international mobile subscriber identity (IMSI) type of attachment as for LTE because circuit switched fallback (CSFB) may not be needed.

At 2-3, as a part of the 5G subscription retrieval procedure, a user data management (UDM) can return the address for SMS function for establishing the Nx association with HPLMN.

At 4, the VPLMN AMF can initiate an Nx association procedure with the given SMS function address from step 3. Then, at 5, the SMS function can retrieve SMS subscription and update the UDM with the UE information based on the current procedure defined for SMS over SGs, as described in TS 23.272 as defined for SMS only functionally.

Then, at 6-7, a SMS registration success indication can be passed back to the UE.

Figure 9:
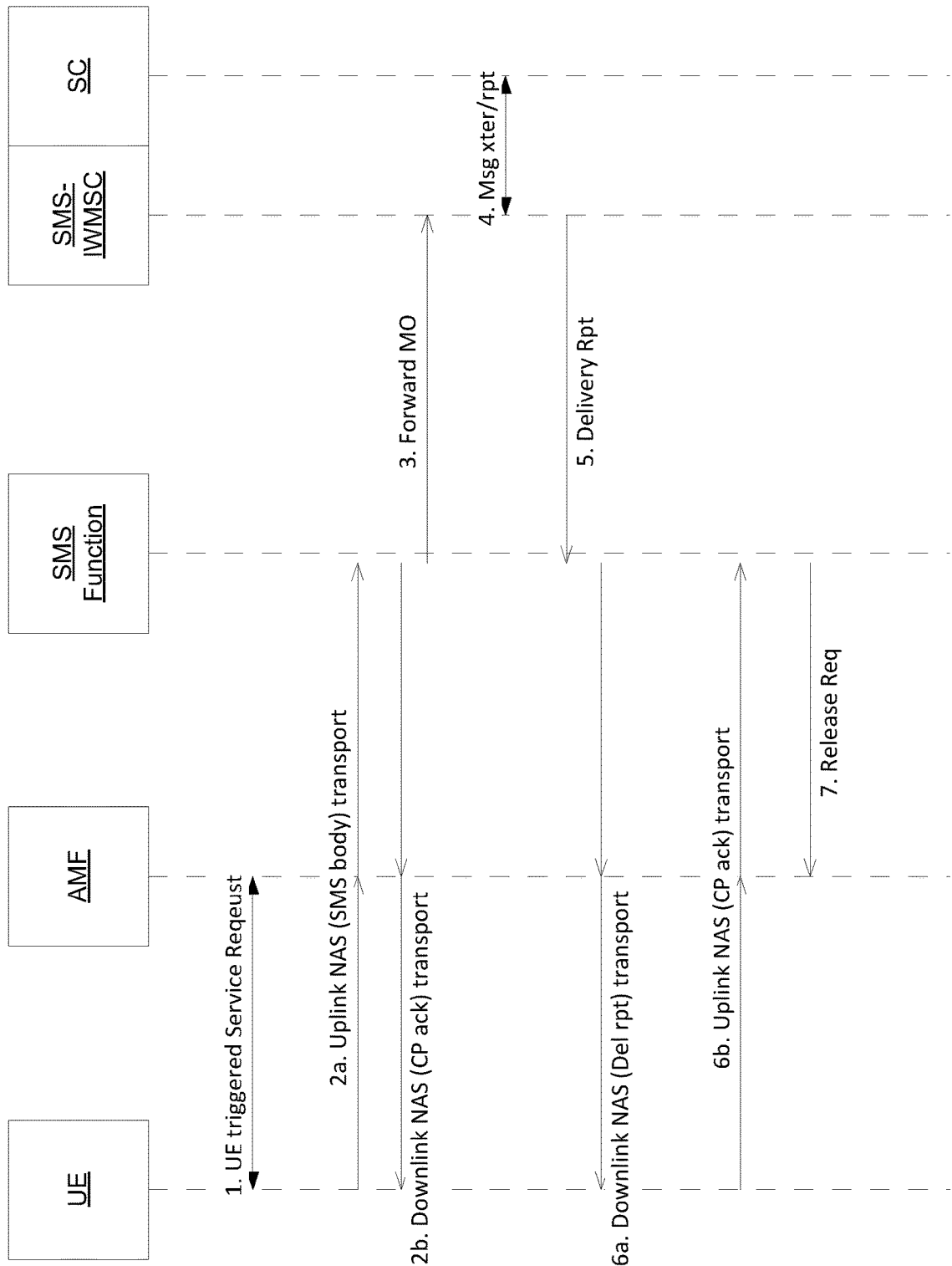
FIG. 9 illustrates a mobile originated SMS procedure for 5G, according to certain embodiments.

FIG. 9 illustrates a mobile originated (MO) SMS procedure for 5G, according to certain embodiments. This procedure may be similar to SMS over SGs with LTE, as described in TS 23.272, section 8.2.2. In this case, the AMF can forward the SMS data transparently to SMS function and vice versa with SGsAP-DOWNLINK-UNITDATA and SGsAP-UPLINK-UNITDATA, as described at TS 29.118.

Figure 10:
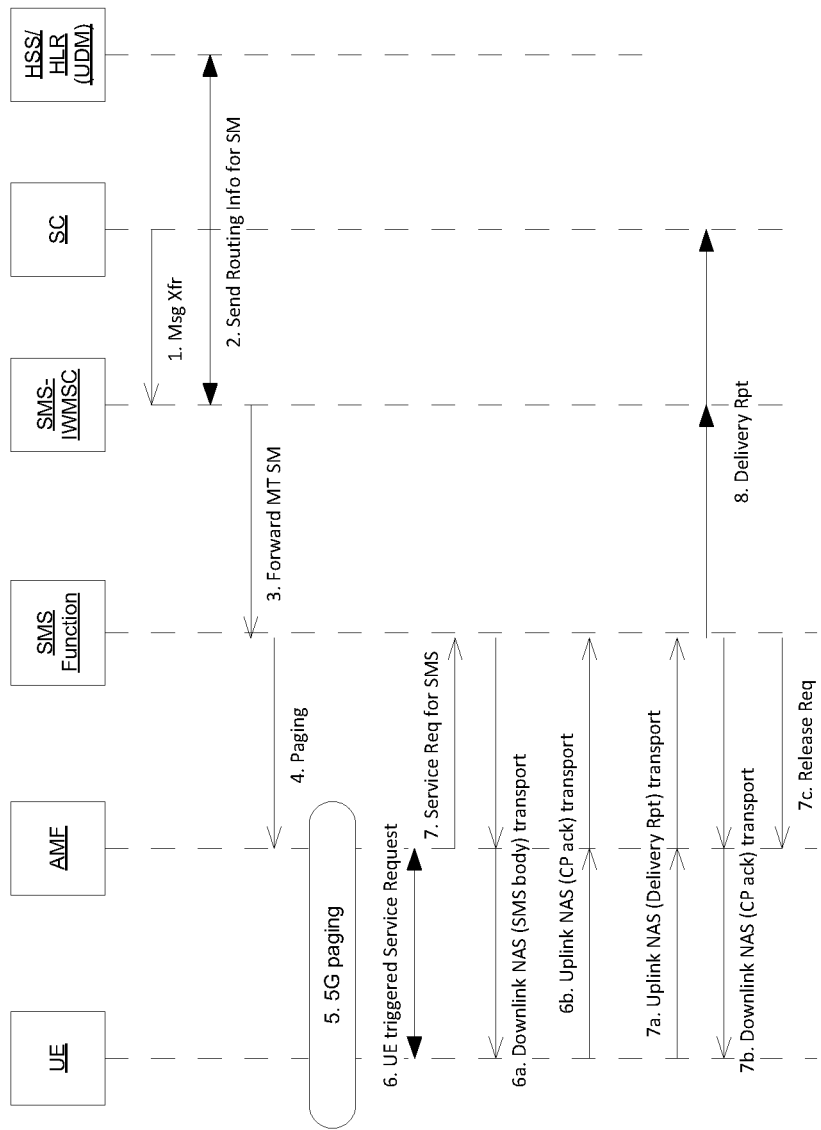
FIG. 10 illustrates a mobile terminated SMS procedure for 5G, according to certain embodiments.

FIG. 10 illustrates a mobile terminated (MT) SMS procedure for 5G, according to certain embodiments. This procedure may be similar to SMS over SGs with LTE, as described in TS 23.272, section 8.2.4). In this case, the SMS function can page the AMF with SGsAP-PAGING-REQUEST, as described in TS 23.118. This message can indicate the paging is for SMS delivery.

The SMS function forwards the SMS data transparently to the AMF and vice versa with SGsAP-DOWNLINK-UNITDATA and SGsAP-UPLINK-UNITDATA, as described in TS 29.118.

For unsuccessful mobile terminated SMS delivery attempt, the following procedure can be used. The SMS function can set a flag similar to the mobile station not reachable flag (MNRF) as defined in TS 23.040. Then, the SMS function can send an alert request message to the AMF, for example an SGsAP-ALERT-REQUEST message as described in TS 29.118. The AMF can set a local "SMS service Alert flag" (SSAF).

With SSAF set, the AMF can notify the SMS function when the UE is active again with a message, similar as SGsAP-UE-ACTIVITY-INDICATION in TS 29.118. When the SMS function is aware of UE activities by AMF, the SMS function can notify UDM similar to MSC/VLR notifies the HLR/HSS as currently defined in TS 23.040. This can trigger an MT SMS redelivery procedure.

Most of the SMS implementation with LIE may be with the SMS over SGs option. This home routed SGs method provides a simple way to allow HPLMN to interwork with deployment VPLMN that does not support SMS function for providing SMS service to the HPLMN's outbound roamers. Allowing Nx as a roaming interface, HPLMN does not have to depend on VPLMN's SMS implementation with a local MSC Server or seca local SMS function with SMS state machine implementation. The AMF implementation can support implementation similar to SGs for SMS as supported in the MME for LTE. The SMS Function, if implemented by MSC server, can reuse the SGs implementation for SMS toward the VPLMN.

When a UE is changing from 5G RAT to 2/3/LTE, the following procedure can be reused to ensure SMS service is continued at a different RAT. When the UE is switching from 5G to LIE, the UE may be expected to follow the current LTE attach/tracking area update (TAU) procedure for SMS and/or CSFB, for example combined attach or combined TAU, or the like.

The MME can select VLR based on a current CSFB procedure as defined in TS 23.272 and 29.118. According to TS 29,118 the following will cause MME to establish an SGs association to a VLR. If timer Ts6-1 is not running, the MME may start the location update for non-EPS services procedure when it receives from the UE any of the following: an attach request indicating combined EPS/IMSI attach; a combined tracking area update request indicating combined TA/LA updating with IMSI attach; a combined tracking area update request and the MME detects that the LAI has changed; a combined tracking area update request and the state of the SGs association is SGs-NULL; or a combined tracking area update request and the MME serving the UE has changed.

The UE may be standardized to perform a "Combined TA/LA updating with IMSI attach" when the UE previously has attached to 5G RAT or MME performs the SGs re-establishment due to "a combined tracking area update request and the MME detects that the LAI has changed" if the LAI provided by AMF is required to be different than MME provided one.

When UE is changing from 2/3/LTE to 5G RAT, the update/or attach procedure in 5G may allow the AMF to re-establish the Nx registration with the SMS function to provide the SMS service.

Figure 11:
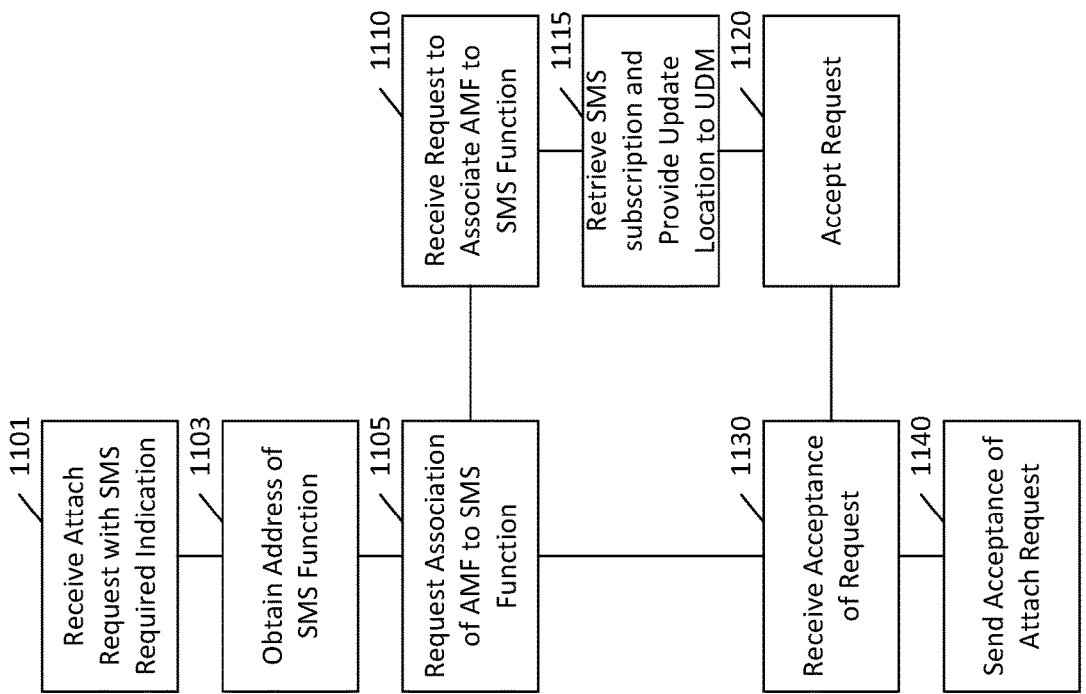
FIG. 11 illustrates a method according to certain embodiments.

FIG. 11 illustrates a method according to certain embodiments. As shown in FIG. 11, a method can include, at 1110, receiving a request, at a short message service function, to associate an access management function to the short message service function. The method can also include, at 1120, accepting the request.

In a variant, the method can include, at 1115, retrieving SMS subscription information and also providing an update location to a UDM upon receiving the request and prior to accepting the request. The request can be based on an attach message that includes an indication that short message service is required.

For example, the method can include, at 1105, requesting a short message service function to associate an access management function to the short message service function. The method can also include, at 1130, receiving an acceptance of the request.

The method can include, at 1101, receiving an attach message that includes an indication that short message service is required. The request for the association, at 1105, can be based on receiving the indication at 1101.

In a variant, the method can further include sending, at 1140, an accept response to the attach message after receiving acceptance of the request at 1130.

In a variant, the method can also include, at 1103, obtaining an address of the short message service function from a user data management. The request can be sent at 1105 using the obtained address.

Figure 12:
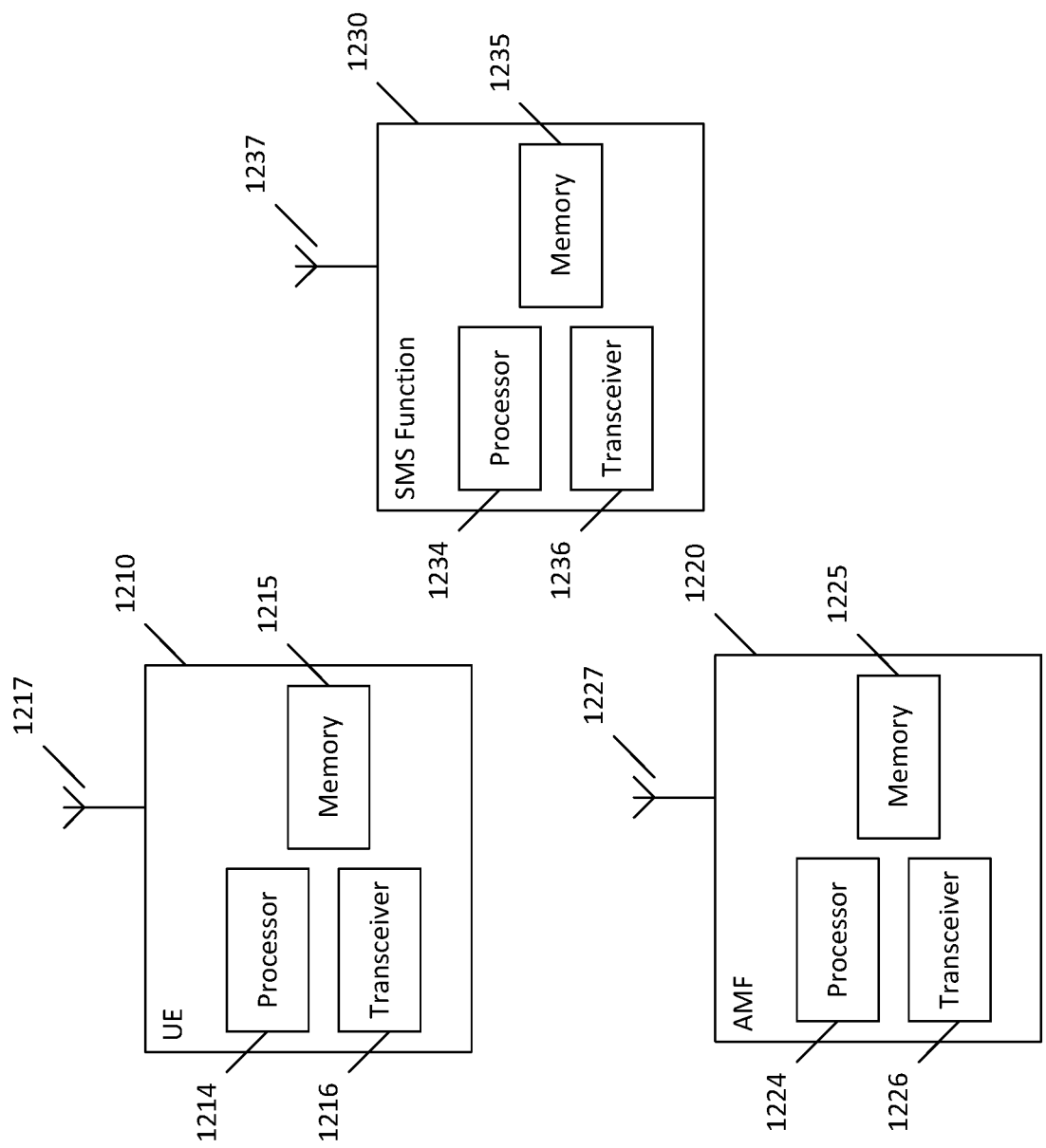
FIG. 12 illustrates a system according to certain embodiments.

FIG. 12 illustrates a system according to certain embodiments of the invention. In one embodiment, a system may include multiple devices, such as, for example, at least one UE 1210, at least one AMF 1220, and at least one SMS function 1230.

Each of these devices may include at least one processor, respectively indicated as 1214, 1224, and 1234. At least one memory can be provided in each device, and indicated as 1215, 1225, and 1235, respectively. The memory may include computer program instructions or computer code contained therein. The processors 1214, 1224, and 1234 and memories 1215, 1225, and 1235, or a subset thereof, can be configured to provide means corresponding to the various blocks of FIG. 11.

As shown in FIG. 12, transceivers 1216, 1226, and 1236 can be provided, and each device may also include an antenna, respectively illustrated as 1217, 1227, and 1237. Other configurations of these devices, for example, may be provided. For example, SMS function 1230 may be configured for wired communication, in addition to wireless communication, and in such a case antenna 1237 can illustrate any form of communication hardware, without requiring a conventional antenna.

Transceivers 1216, 1226, and 1236 can each, independently, be a transmitter, a receiver, or both a transmitter and a receiver, or a unit or device that is configured both for transmission and reception.

Processors 1214, 1224, and 1234 can be embodied by any computational or data processing device, such as a central processing unit (CPU), application specific integrated circuit (ASIC), or comparable device. The processors can be implemented as a single controller, or a plurality of controllers or processors.

Memories 1215, 1225, and 1235 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 1210, AMF 1220, and SMS function 1230, to perform any of the processes described herein (see, for example, FIGS. 8 through 11). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 12 illustrates a system including a UE, AMF, and SMS function, embodiments of the invention may be applicable to other configurations, and configurations involving additional elements. For example, not shown, additional UEs may be present, and additional core network elements may be present, as illustrated in FIGS. 1 through 10.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving, by an access management function, an attach request from a user equipment, the attach request comprising an indication that short message service is required;
selecting, by the access management function, a short message service function;
requesting, by the access management function, the short message service function in a core network to associate the access management function in the core network to the short message service function;
receiving, by the access management function, from the short message service function, an acceptance of the request;
sending, by the access management function, to the user equipment an acceptance of the attach request;

upon reception of mobile originated short message service data from the user equipment, by the access management function, forwarding the short message service data to the short message service function; and obtaining information of the short message service function from a user data management where the short message service function is located in a home public land mobile network.

2. The method of claim 1, wherein the request is sent using the obtained information.

3. An access management function, comprising:

at least one processor; and at least one memory including computer program code, wherein the at least one memory and the computer program code are configured to, with the at least one processor, cause the access management function at least to receive an attach request from a user equipment, the attach request comprising an indication that short message service is required;

select a short message service function;

request the short message service function in a core network to associate the access management function in the core network to the short message service function;

receive, from the short message service function, an acceptance of the request;

send to the user equipment an acceptance of the attach request;

upon reception of mobile originated short message service data from the user equipment, forward the short message service data to the short message service function; and obtain information of the short message service function from a user data management where the short message service function is located in a home public land mobile network.

4. The access management function of claim 3, wherein the request is sent using the obtained information.

* * * * *